(12) United States Patent
Deng

(10) Patent No.: US 11,321,598 B2
(45) Date of Patent: May 3, 2022

(54) MULTICOLOR BARCODE AND COLOR CALIBRATION METHOD THEREOF

(71) Applicant: GUANGDONG MATVIEW INTELLIGENT SCIENCE & TECHNOLOGY CO., LTD., Guangdong (CN)

(72) Inventor: Libang Deng, Guangdong (CN)

(73) Assignee: GUANGDONG MATVIEW INTELLIGENT SCIENCE & TECHNOLOGY CO., LTD., Guangzhou (CN)

( * ) Notice: Subject to any disclaimer, the term of this patent is extended or adjusted under 35 U.S.C. 154(b) by 51 days.

(21) Appl. No.: 17/053,773

(22) PCT Filed: Oct. 23, 2018

(86) PCT No.: PCT/CN2018/111414
§ 371 (c)(1),
(2) Date: Jan. 6, 2021

(87) PCT Pub. No.: WO2019/214169
PCT Pub. Date: Nov. 14, 2019

(65) Prior Publication Data
US 2021/0224623 A1    Jul. 22, 2021

(30) Foreign Application Priority Data
May 7, 2018   (CN) .......................... 201810425908.5

(51) Int. Cl.
*G06K 19/06*    (2006.01)
*H04N 1/60*    (2006.01)
(Continued)

(52) U.S. Cl.
CPC ......... *G06K 19/0614* (2013.01); *G06V 10/56* (2022.01); *H04N 1/6077* (2013.01); *H04N 1/626* (2013.01)

(58) Field of Classification Search
CPC .. G06K 19/0614; G06V 10/56; H04N 1/6077; H04N 1/626
(Continued)

(56) References Cited

U.S. PATENT DOCUMENTS

2007/0272755 A1* 11/2007 Chang ...................... G06K 7/14
                                                                                235/494
2008/0191035 A1*  8/2008 Cheon .................... G06K 1/123
                                                                                235/494
2017/0076191 A1*  3/2017 Feng ................ G06K 19/06037

FOREIGN PATENT DOCUMENTS

CN            102137272 A         7/2011
CN            106529633 A         3/2017
(Continued)

OTHER PUBLICATIONS

International Search Report of PCT Patent Application No. PCT/CN2018/111414 dated Feb. 11, 2019.

*Primary Examiner* — Michael G Lee
*Assistant Examiner* — David Tardif

(57) ABSTRACT

The present disclosure discloses a multicolor barcode. The multicolor barcode includes a start region (1), a data region (2), and a check region (3). The start region (1), the data region (2), and the check region (3) are arranged in sequence. The start region (1) includes a start color block that indicates a start position of the multicolor barcode, the data region (2) includes a data color block that indicates encoded data of the multicolor barcode, and the check region (3) includes a check color block that indicates an end position of the multicolor barcode. The start color block includes a first color block and a second color block, the first
(Continued)

color block is located at the start position, and the second color block is a white color block. The present disclosure further provides a color calibration method for a multicolor barcode, and a computer-readable storage medium.

20 Claims, 1 Drawing Sheet

(51) Int. Cl.
*H04N 1/62* (2006.01)
*G06V 10/56* (2022.01)

(58) Field of Classification Search
USPC .......................................................... 235/494
See application file for complete search history.

(56) References Cited

FOREIGN PATENT DOCUMENTS

| CN | 107871151 A | * | 4/2018 | | |
| CN | 107871151 A | | 4/2018 | | |
| CN | 108960382 A | * | 12/2018 | ....... | G06K 19/06028 |
| WO | WO-2013162577 A1 | * | 10/2013 | ....... | G06K 19/06037 |

* cited by examiner

MULTICOLOR BARCODE AND COLOR CALIBRATION METHOD THEREOF

TECHNICAL FIELD

The present disclosure relates to the field of barcode recognition technologies, and in particular, to a multicolor barcode and a color calibration method thereof.

BACKGROUND

Currently, barcode technologies support encoding, printing, recognition, and data collection and processing, and are widely applied in fields such as commodity circulation, book management, and postal management. With the rapid expansion and development of retail businesses and consumer markets, labels and barcodes are increasingly applied.

An existing barcode is a graphic identifier obtained by arranging a plurality of unequal-width black and white bars and their corresponding characters according to a specific encoding rule, and is used to express a group of information. In the barcode, information expressed by the black and white bars is the same as that expressed by the characters corresponding to the black and white bars, and different widths of the black and white bars are used to define different numerals.

A dedicated recognition and reading device needs to be used to recognize and read the existing barcode based on borders and widths of the black and white bars. A color difference between the blank and white bars needs to be as large as possible. Therefore, it is ideal to make black bars on a white background. In addition, the recognition and reading of the barcode is greatly affected by a sensitivity and a distance of a scanning device.

The corresponding characters in the barcode are usually a group of Arabic numerals, and are directly recognized and read by people or are input into a computer by using a keyboard. In manual recognition and reading, an error may easily occur, and recognition, reading and input speeds are low, resulting in low efficiency. In addition, the existing barcode needs to be scanned, recognized and read by using the dedicated scanning device or manually input for recognition and reading, causing low processing efficiency.

SUMMARY

To overcome disadvantages of the prior art, a first objective of the present disclosure is to provide a multicolor barcode, to resolve a technical problem of white balance correction of the multicolor barcode.

A second objective of the present disclosure is to provide a color calibration method for a multicolor barcode, to resolve the technical problem of white balance correction of the multicolor barcode.

A third objective of the present disclosure is to provide a computer-readable storage medium, to resolve the technical problem of white balance correction of the multicolor barcode.

The first objective of the present disclosure is implemented by using the following technical solutions:

A multicolor barcode includes a start region, a data region, and a check region, where the start region, the data region, and the check region are arranged in sequence, the start region includes a start color block that indicates a start position of the multicolor barcode, the data region includes a data color block that indicates encoded data of the multicolor barcode, the check region includes a check color block that indicates an end position of the multicolor barcode, the start color block includes a first color block and a second color block, the first color block is located at the start position, and the second color block is a white color block.

Further, there are two first color blocks, and the first color block, the second color block, and the first color block are successively connected to constitute the start color block.

Further, the first color block is a black color block, and area occupied by the second color block is 50% of area occupied by the start color block.

Further, an encoded color in the data color block corresponds to a respective character.

Further, the character is a numeral, and all numerals from 0 to 9 one-to-one correspond to respective encoded colors, so that the numerals are displayed as the encoded colors.

The second objective of the present disclosure is implemented by using the following technical solutions:

A color calibration method for a multicolor barcode includes the following steps:

an image obtaining step: obtaining current image information;

a selection step: obtaining a white color block in the current image information; and a white balance correction step: calculating an average color value of the white color block, and performing white balance correction on a multicolor barcode in the current image information.

Further, the current image information includes the multicolor barcode, the multicolor barcode includes the white color block, and the selection step specifically includes the following substeps:

selecting a start region in the multicolor barcode; and locating the white color block based on a start color block in the start region.

Further, the white balance correction step specifically includes the following substeps:

calculating average values $R_{avew}$, $G_{avew}$, and $B_{avew}$ of luminance values of various color channels in the white color block;

calculating gain values of the color channels in the white color block according to the following gain formulas:

$R_{gain}=Y_{max}/R_{avew}$, $G_{gain}=Y_{max}/G_{avew}$, and $B_{gain}=Y_{max}/B_{avew}$, where $Y_{max}$ indicates a maximum value of a Y component of YCbCr color space in a multicolor barcode image, and $R_{gain}$, $G_{gain}$, and $B_{gain}$ indicate the gain values of the R, G, and B channels respectively; and calculating corrected color values R', G', and B' of the color channels in the multicolor barcode according to the following white balance formulas: $R'=R\times R_{gain}$, $G'=G\times G_{gain}$, and $B'=B\times B_{gain}$, where R, G, and B are values in current color space.

Further, after the white balance correction step, the color calibration method further includes the following steps:

a color obtaining step: extracting an average value of encoded colors of various data color blocks in a corrected multicolor barcode to obtain color information of the data blocks based on the HSB color space; and a barcode recognition step: obtaining a recognition result of the multicolor barcode based on the obtained color information of the data blocks based on the HSB color space and a barcode encoding rule.

The third objective of the present invention is implemented by using the following technical solutions:

A computer-readable storage medium stores a computer program. The computer program is executed by a processor to perform the color calibration method for a multicolor barcode described in any part in the second objective of the present disclosure.

The present disclosure has the following advantageous effects compared with the prior art:

According to the color calibration method for a multicolor barcode in the present disclosure, a white color block in current image information is obtained to correct a color of a multicolor barcode, to improve recognition precision of the multicolor barcode.

Reference signs: 1: start region; 2: data region; 3: check region; 4: blank region.

DETAILED DESCRIPTION

The present disclosure will be further described below with reference to the accompanying drawings and specific embodiments. It should be noted that, provided that there is no conflict, new embodiments can be formed by arbitrarily combining various embodiments or various technical features described below.

Embodiment 1

Figure 1:
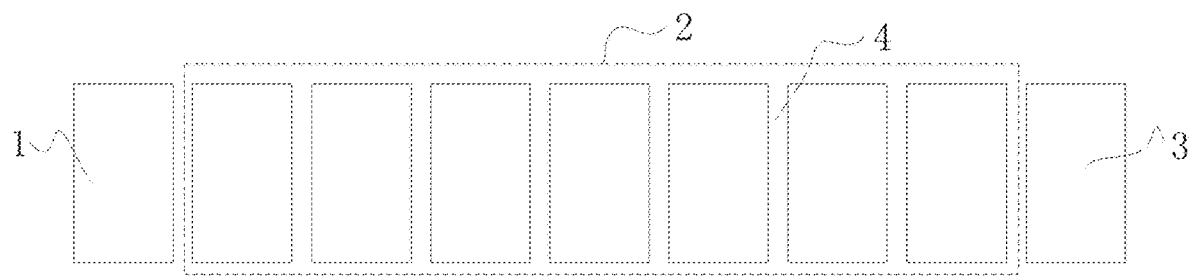
FIG. 1 is a schematic diagram of a multicolor barcode according to Embodiment 1.

As shown in FIG. 1, this embodiment provides a multicolor barcode, including a start region, a data region, and a check region, where the start region, the data region, and the check region are arranged in sequence, the start region includes a start color block that indicates a start position of the multicolor barcode, the start color block includes a first color block and a second color block, the first color block is located at the start position, and the second color block is a white color block. The white color block is mainly used to perform color correction. To achieve a better effect, extracted white needs to be accurate. Therefore, there are two first color blocks, and the first color block, the second color block, and the first color block are successively connected to constitute the start color block. The first color block is a black color block, and area occupied by the second color block is 50% of area occupied by the start color block. The first color block may be red, blue, or the like. However, a contrast between these colors and white is weaker than a contrast between black and the white. Therefore, the black is preferably used.

The start region is the $1^{st}$ character of the barcode, and is used to prompt a reading device to start to officially read code content when the character is recognized. In addition, the start region is further used to correct a color of the barcode. The start region is represented by using a combination of a specially defined color block and a color value. To facilitate color correction, the start color block in the start region in the present disclosure is defined by using a color block obtained by combining the black, the white, and the black in sequence. A white region is a reference region for color correction. A position of the white region and a proportion of the white region to a black region are fixed. Two adjacent black regions are set to help locate the white region more accurately. The white region accounts for 50% of area of the entire color block, and the two adjacent black regions each occupy 25% of the area of the entire color block. In addition to these proportions, other proportions may also be used. During barcode recognition, an accurate value of each barcode needs to be determined. As a color comparison region during recognition, the white reference region needs to be tailored at a pixel level. The black is selected for the adjacent regions of the white region because a color difference between the black and the white is largest. A border between the white region and the black region can be recognized and determined more accurately. Such a setting facilitates accurate locating of the reference region, thereby ensuring accurate color determining.

The data region includes a data color block that indicates encoded data of the multicolor barcode. As main content of the barcode, the data region is a combination of various numeral and letter color blocks corresponding to various color values defined according to an encoding rule. When the barcode is printed, whether to display a numeral or a letter represented by a corresponding color block may be set as required. In an actual application, a combination of numerals 0 to 9 is used to encode the barcode, and a specific color value is set for each numeral. The encoding rule is defined based on a corresponding industry, a product category, and a user requirement.

The numerals 0 to 9 one-to-one correspond to dark blue, dark green, purple, yellow, red, pink, orange, light blue, brown, and dark green in colors. This is only one implementation. A combination of other different colors may alternatively be used, provided that a contrast between selected colors is relatively obvious. In start and end flags of the multicolor barcode, the black (or another fixed color) and a color value corresponding to a numeral each may account for a half. A color bar has a fixed width. Therefore, the start and end flags in which the black and the color value corresponding to the numeral each account for half the width can be easily determined. Therefore, a rectangle in which the black and the color corresponding to the numeral each account for a half is preferably used to perform an operation. For an image shot by a camera, a color difference may be easily caused due to an external light source, and therefore fewer color categories are preferably selected. Therefore, ten colors are used to represent ten numerals, and this can greatly improve accuracy. In an actual application, letters corresponding to color values with a relatively large color difference may also be selected as extensions based on an encoding requirement. This can ensure accuracy of recognition from another aspect.

The check region includes a check color block that indicates an end position of the multicolor barcode. The check region has a special structure and is the last character, namely, an end character, of the barcode. The check region is used to notify a scanning device of completion of scanning the entire barcode and start of checking, according to a check rule, whether read data is correct. The check rule is defined according to the encoding rule.

In an application in a library, the ten numerals from 0 to 9 are combined to encode books for category-based management and storage. A corresponding encoding rule is as follows:

In a library scenario, a combination of a numeral 9 (corresponding to the fixed black) and a color value of the numeral 9 is used as the start region of the barcode. In the barcode, the $2^{nd}$ and $3^{rd}$ characters correspond to each branch library; the $4^{th}$ and $5^{th}$ characters correspond to a category of a book; and the $6^{th}$, $7^{th}$, $8^{th}$, and $9^{th}$ characters correspond to a storage bookshelf of the book and a position sequence number of the book on the bookshelf.

The $2^{nd}$ to the $9^{th}$ characters are encoded and combined by using any numeral from 0 to 9 and according to a book management and storage rule, and are indicated by using, according to the encoding rule, color blocks of a specified color value that have a same shape, width, and size. Certainly, color blocks with different shapes may alternatively be used, provided that a color value corresponding to the encoding rule is used.

The $10^{th}$ character is the check region 3. The $10^{th}$ character is calculated based on values of the first 9 characters of the barcode and the check rule, and is indicated by using a combination of a specified black block and a color value corresponding to the check region 3. The $10^{th}$ character is used to prompt that the recognition ends when the scanning device reads the character and the check starts.

The barcode is attached to a side surface of the book and is numbered 901033584?. In the barcode, "9" indicates that this article is a book, 01 indicates a branch library in which the book is stored, 03 indicates the category of the book, 3584 indicates the storage bookshelf and the position sequence number of the book, and "?" is calculated according to the check rule.

Each character in the barcode, information indicated by each character, and a check code calculation manner are shown in the following Table 1.

The multicolor barcode in the present disclosure is mainly identified by the foregoing several features. In addition to the start region, the data region, and the check region, the multicolor barcode further includes a quiet zone used to indicate start and end of the multicolor barcode. The quiet zone is mainly used to ensure that barcode information can be correctly recognized, so that two adjacent barcodes can be easily differentiated by the reading device. The quiet zone mainly includes a blank margin before the start region and a blank margin after the check region.

A character in each type of region indicates corresponding information by using a color block defined according to a rule. Sizes and shapes of color blocks corresponding to various characters may be the same. The shapes of the color blocks may alternatively be different, provided that a combined image of various colors on the barcode can be clearly shot by the camera within a certain distance range.

Figure 2:
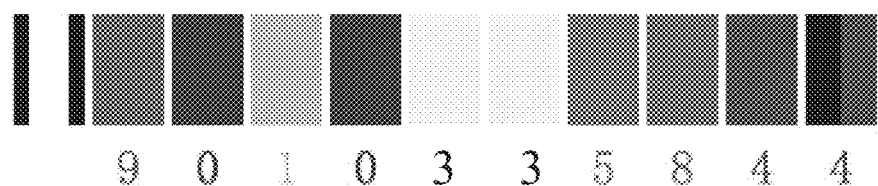
FIG. 2 is a diagram showing a display effect of a multicolor barcode according to Embodiment 1.

When the barcode shown in FIG. 2 is scanned, the category, the storage library, the storage bookshelf, and the specific position on the bookshelf can be determined for the book based on a scanning result, to facilitate category-based management and storage of the book. In addition to book management and storage, the method in the present disclosure can also be applied to storage and management of warehouse stocks, express mail services, and the like.

Widths and shapes of "bars" included in each multicolor barcode provided in the present disclosure may be the same.

| Barcode numbered B010335Q4?, where ? is a check code | | | | | | | | | | | |
|---|---|---|---|---|---|---|---|---|---|---|---|
| 1. Numbered from right to left | Position sequence number | 10 | 9 | 8 | 7 | 6 | 5 | 4 | 3 | 2 | 1 |
| | Barcode Encoding rule | 9 Start character | 0 Numbering based on each branch library | 1 | 0 Numbering based on the category of the book | 3 | 3 Numbering based on the storage bookshelf of the book and the position sequence number of the book on the bookshelf | 5 | 8 | 4 | ? Check code |
| 2. Obtain a sum ① of numerals in even positions starting from the sequence number 2: | | | | | 4 + 5 + 3 + 1 + 9 = 22 | | | | | | |
| 3. ① × 3 = ② | | | | | 22 × 3 = 66 | | | | | | |
| 4. Obtain a sum ③ of numerals in odd positions starting from the sequence number 3: | | | | | 8 + 3 + 0 + 0 + 9 = 20 | | | | | | |
| 5. ② + ③ = ④ | | | | | 66 + 20 = 86 | | | | | | |
| 6. Subtract ④ from a numeral that is greater than or equal to ④ and is a minimum integer multiple of 10, to obtain a value of the check code. | | | | | 90 − 86 = 4 Therefore, it is obtained according to the foregoing steps 1 to 6 that ? (the check code) is equal to 4. The barcode is 9010335844. | | | | | | |

In the library, when a camera of the scanning device reads 5 or a barcode combination of a color block and a color value corresponding to a numeral other than 9 or a letter in the start region, the scanning device determines that this article is not a book and is incorrectly stored, and prompts that this article needs to be removed. In addition to the foregoing recognition rule, another recognition method may also be used to perform determining, provided that a check purpose can be achieved.

A numeral corresponding to each bar is defined by using a color value of the "bar". A current barcode can be recognized only by a dedicated scanning device, and only one type of barcode can be recognized each time, resulting in low recognition efficiency to a given extent. However, the barcode provided in the present disclosure supports batch recognition and reading by the camera or an ordinary photographing apparatus, so that data processing efficiency is high. In addition, no dedicated scanning device is required for the barcode provided in the present disclosure, and therefore the barcode can be applied more conveniently. The barcode in the present disclosure is recognized based on the color value. In addition, each barcode has a corresponding start position and end position, and therefore can be easily recognized by a recognition device. This provides a basis for mass scanning and recognition. In addition to book management and storage, the multicolor barcode in this embodiment can also be applied to storage and management of the warehouse stocks and the express mail services, and the like.

In addition, information of the barcode is recognized and read based on the color block, free from the width of the article. The barcode can be applied to thin and long articles, and is different from the existing barcode in which information matching is performed based on different widths of black and white bars and that can be scanned and read by a scanner only after being attached to a large-area wide article. Therefore, the barcode in the present disclosure is applied more widely. In addition, color correction improves recognition precision of the multicolor barcode in this embodiment.

Embodiment 2

In addition to the numeral-based encoding manner in Embodiment 1, a combined encoding manner in which 26 letters are used may also be used. In this case, a numeral needs to set for each of the 26 letters, to facilitate data check. For example, the 26 letters correspond to numerals 11 to 36 in sequence, and one color value is specified for each letter. A specific value is set for each of the 26 letters, to facilitate setting of a check region according to a specified encoding rule, to perform barcode check. Setting of color calibration enables a barcode to have higher recognition precision. Therefore, when more colors are used, recognition accuracy of the barcode is also improved greatly.

Table 2 shows a correspondence between a letter and a numeral.

| Letter | A | B | C | D | E | F | G | H | I | J | K | L | M |
|---|---|---|---|---|---|---|---|---|---|---|---|---|---|
| Corresponding numeral | 11 | 12 | 13 | 14 | 15 | 16 | 17 | 18 | 19 | 20 | 21 | 22 | 23 |
| Letter | N | O | P | Q | R | S | T | U | V | W | X | Y | Z |
| Corresponding numeral | 24 | 25 | 26 | 27 | 28 | 29 | 30 | 31 | 32 | 33 | 34 | 35 | 36 |

A color value is specified based on a corresponding letter in an application, and cannot be changed at will.

Embodiment 3

Figure 3:
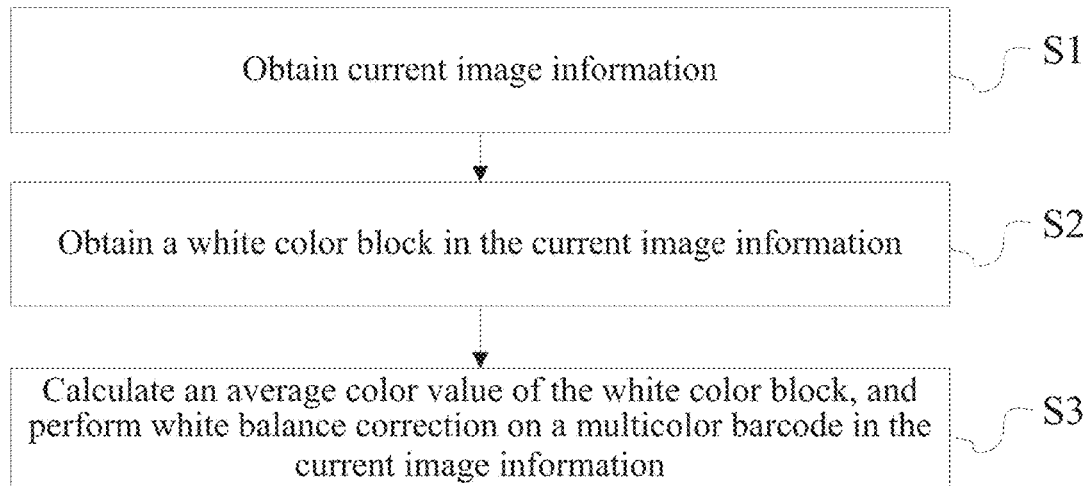
FIG. 3 is a flowchart of a color calibration method for a multicolor barcode according to Embodiment 3.

As shown in FIG. 3, this embodiment provides a color calibration method for a multicolor barcode, including the following steps.

S1: Obtain current image information. White plays a key role in white balance correction. The white herein may be obtained in two manners. In one manner, a multicolor barcode directly includes a white color block. In the other manner, a white color block is not included in a multicolor barcode. In this embodiment, recognition is performed for a case in which the multicolor barcode includes the white color block.

In this embodiment, to separate the multicolor barcode from the current image information, a corresponding recognition model base needs to be constructed for the multicolor barcode in advance. Lots of multicolor barcode images are learned by using a machine, to establish a multicolor barcode recognition model in advance. During learning, lots of multicolor barcode images shot at different angles and under different light rays are obtained. Then, preprocessing, feature extraction, and repeated recognition training are performed on the obtained multicolor barcode images, to establish the multicolor barcode recognition model. In this way, a plurality of multicolor barcodes included in the images can be determined by comparing the images with the recognition model, and the multicolor barcode images are located and corrected. Preprocessing such as noise and interference removal, image cutting, and normalization on the multicolor barcode images can improve image processing and recognition performance of a server. Irrelevant information is deleted from the image, useful real information is restored, detectability of relevant information is enhanced, and data is simplified to a greatest extent, to improve reliability of feature extraction, matching, and recognition. Feature extraction is performed on a preprocessed multicolor barcode image. The barcode image is partitioned into 25 (5*5) checkered regions based on colors of spatial densities and pattern arrangements of different multicolor barcode images, and a 25-dimensional feature vector is obtained by calculating a proportion of a quantity of points in each checker to a total quantity of points in the multicolor barcode image. Through repeated recognition training, a standard template is extracted from each barcode image in a training set, to establish a standard feature base. Then, the multicolor barcode recognition model is established. There are hundreds of standard templates for each type of barcode. The barcode is of directivity. Therefore, during training, the barcode images need to be correctly arranged based on a start direction before being learned by the machine. After preprocessing and feature extraction, all barcode feature vectors in the training set are stored in a file. During training, a correct value of each type of barcode needs to be specified. Then, model construction is completed.

During actual processing, first, the current image information needs to be obtained, and the obtained multicolor barcode images need to be preprocessed. The preprocessing mainly includes noise and interference removal, image cutting, and normalization, and can improve the image processing and recognition performance of the server. Various multicolor barcode regions included in the images are determined through comparison with the recognition model. Barcode locating and 3D correction are performed on the multicolor barcode images based on the determined multicolor barcode regions.

Barcode locating: Feature extraction is performed on the preprocessed multicolor barcode image, to find out distinguishing attributes such as a color, a pattern, and a shape of the multicolor barcode, and calculate geometric feature parameters of these distinguishing attributes. A feature vector describing the multicolor barcode is generated based on these feature parameters, and is compared with a feature vector in the multicolor barcode recognition model established in a system. When a similarity exceeds 80%, one multicolor barcode region is determined, and the multicolor barcode region is located based on a determining result.

3D correction: A barcode image is usually distorted, rotated, or inverted to a certain degree due to a photographing angle and an angle of placing an article to which a barcode is attached. Therefore, 3D correction needs to be performed for a single barcode image. Through spatial mapping, four points at the top, bottom, left, and right corners of each located barcode are fixed and then projected. Then, each barcode image is rotated or corrected, so that the barcode image is arranged into a standard rectangle region based on a start direction of the barcode, to obtain a single barcode image with a standard shape and size.

S2: Obtain the white color block in the current image information. The current image information includes the multicolor barcode, and the multicolor barcode includes the white color block. The step S2 specifically includes the following substeps:

A start region in the multicolor barcode is selected. The start region needs to be located first before the white color block is selected. Then, the white color block is located based on a start color block in the start region. A white color block in each multicolor barcode is determined and selected. A characteristic of a light source for photographing the multicolor barcode is calculated based on an average color value of the white color block, to perform white balance correction on a multicolor barcode image and analyze a color value of each bar block in a corrected multicolor barcode.

White balance correction: In different lighting environments, there may be a certain difference between a collected image color and a real color. For example, a color of an image shot under a green light source is greener and colder than a real color as a whole, while a color of an image shot under a red light source is redder and warmer than a real color. Therefore, a proper color balance (correction) algorithm needs to be selected to eliminate impact of a lighting environment on a color. In this way, a color value of a bar block in a multicolor barcode image shot by a camera can be accurately extracted, avoiding incorrect determining.

When white balance correction is performed, a white reference region in the multicolor barcode is first selected. An edge of the white color block is determined based on a largest color difference at a border between a black color block and the white color block in the start region (namely, a region in which the $1^{st}$ character of the barcode is located) of the multicolor barcode, and a white region is selected. The white reference region is obtained by scaling down the selected region by one threshold range as a whole. The start character is in a form of a color block obtained by combing black, white, and black. The white color block is used as a reference region for color correction, and the black color block is used to help locate the white region more accurately. The selected white reference region is scaled down as a whole to exclude mottled pixels that are located at the border between the white color block and the black color block and that cause interference to determining. This can ensure that the white region of the multicolor barcode is selected, and ensure accuracy of the determining.

S3: Calculate the average color value of the white color block to determine a characteristic of an ambient light source, and perform white balance correction on the multicolor barcode in the current image information. The step S3 specifically includes the following substeps:

calculating average values $R_{avew}$, $G_{avew}$, and $B_{avew}$ of luminance values of various color channels in the white color block;

calculating gain values of the color channels in the white color block according to the following gain formulas:

$R_{gain}=Y_{max}/R_{avew}$, $G_{gain}=Y_{max}/G_{avew}$, and $B_{gain}=Y_{max}/B_{avew}$, where $Y_{max}$ indicates a maximum value of a Y component of YCbCr color space in the multicolor barcode image, and $R_{gain}$, $G_{gain}$, and $B_{gain}$ indicate the gain values of the R, G, and B channels respectively; and calculating corrected color values R', G', and B' of the color channels in the multicolor barcode according to the following white balance formulas: $R'=R\times R_{gain}$, $G'=G\times G_{gain}$, and $B'=B\times B_{gain}$, where R, G, and B are values in current color space.

S4: Extract an average value of encoded colors of various data color blocks in a corrected multicolor barcode to obtain color information of the data blocks based on the HSB color space.

S5: Obtain a recognition result of the multicolor barcode based on the obtained color information of the data blocks based on the HSB color space and a barcode encoding rule. Further, relevant information of the multicolor barcode may be determined based on the obtained color information.

Physically speaking, in the gray world algorithm, it is assumed that an average value of average reflection of a light ray by natural sceneries is a constant as a whole, and the constant approximates "gray". In a white balance algorithm of a given image, it is assumed in the gray world that the image has sufficient reflective surfaces so that the image may be used as an epitome of the natural sceneries. If the image is shot under a typical light source, the average value should be equal to the gray. If the image is shot under a non-typical light source, the average value is greater than or less than the gray value. A deviation of the average value from the gray reflects a characteristic of an unknown light source relative to a known light source.

According to the imaging theory, a color obtained after a light source is reflected by a pure white reflective surface can always reflect a color of the light source completely. If a scenery includes pure white content, light source information can be extracted directly from these pixels.

When a characteristic of an unknown ambient light source is calculated, a relevant statistical characteristic is extracted from the white reference region in the multicolor barcode image. It is assumed that unknown ambient light sources in the entire multicolor barcode image are consistent, a method for taking an average value is used to estimate a key statistical parameter of the unknown light sources.

Embodiment 4

Embodiment 4 discloses a readable computer storage medium. The storage medium is used to store a program. The program is executed by a processor to perform the color calibration method for a multicolor barcode in Embodiment 3.

Of course, the embodiments of the present disclosure provide a storage medium including a computer executable instruction. In addition to performing the foregoing method operations, the computer executable instruction can also be used to perform relevant operations in the method provided in any embodiment of the present disclosure.

Based on the above description of the embodiments, those skilled in the art can clearly understand that the present disclosure may be implemented by software and necessary general-purpose hardware. Of course, the present disclosure may also be implemented by hardware, but the former is a better implementation in many cases. Based on such an understanding, the technical solutions of the present disclosure essentially or the part contributing to the prior art may be implemented in a form of a software product. The computer software product may be stored in a computer-readable storage medium such as a floppy disk, a read-only memory (Read-Only Memory, ROM), a random access memory (Random Access Memory, RAM), a flash memory (FLASH), a hard disk, or an optical disc of a computer, and includes several instructions for enabling an electronic device (which may be a personal computer, a server, a network device, or the like) to perform the methods described in the embodiments of the present disclosure.

It should be noted that, in the embodiment based on the multicolor barcode and the color calibration method thereof, the included units and modules are obtained through division based on functions and logic, but are not limited to the foregoing division, provided that corresponding functions can be implemented. In addition, specific names of various functional units are merely used for differentiation and are not intended to limit the protection scope of the present disclosure.

The above-described embodiments are merely preferred embodiments of the present disclosure, and are not intended to limit the protection scope of the present disclosure. Any insubstantial changes and replacements made by those skilled in the art on the basis of the present disclosure fall within the protection scope of the present disclosure.

What is claimed is:

1. A color calibration method for a multicolor barcode, wherein the multicolor barcode comprises a start region, a data region, and a check region, wherein the start region, the data region, and the check region are arranged in sequence, the start region comprises a start color block that indicates a start position of the multicolor barcode, the data region comprises a data color block that indicates encoded data of the multicolor barcode, the check region comprises a check color block that indicates an end position of the multicolor barcode, the start color block comprises a first color block and a second color block, the first color block is located at the start position, and the second color block is a white color block, the color calibration method comprises the following steps:

an image obtaining step: obtaining current image information;

a selection step: obtaining the white color block in the current image information; and a white balance correction step: calculating an average color value of the white color block, and performing white balance correction on the multicolor barcode in the current image information.

2. The color calibration method for a multicolor barcode according to claim 1, wherein the current image information comprises the multicolor barcode, the multicolor barcode comprises the white color block, and the selection step specifically comprises the following substeps:

selecting a start region in the multicolor barcode; and
locating the white color block based on a start color block in the start region.

3. The color calibration method for a multicolor barcode according to claim 1, wherein the white balance correction step specifically comprises the following substeps:

calculating average values $R_{avew}$, $G_{avew}$, and $B_{avew}$ of luminance values of various color channels in the white color block;

calculating gain values of the color channels in the white color block according to the following gain formulas: $R_{gain}=Y_{max}/R_{avew}$, $G_{gain}=Y_{max}/G_{avew}$, and $B_{gain}=Y_{max}/B_{avew}$, wherein $Y_{max}$ indicates a maximum value of a Y component of YCbCr color space in a multicolor barcode image, and $R_{gain}$, $G_{gain}$, and $B_{gain}$ indicate the gain values of the R, G, and B channels respectively; and calculating corrected color values R', G', and B' of the color channels in the multicolor barcode according to the following white balance formulas: $R'=R\times R_{gain}$, $G'=G\times G_{gain}$, and $B'=B\times B_{gain}$ wherein R, G, and B are values in current color space.

4. The color calibration method for a multicolor barcode according to claim 1, wherein after the white balance correction step, the color calibration method further comprises the following steps:

a color obtaining step: extracting an average value of encoded colors of various data color blocks in a corrected multicolor barcode to obtain color information of the data blocks based on the HSB color space; and a barcode recognition step: obtaining a recognition result of the multicolor barcode based on the obtained color information of the data blocks based on the HSB color space and a barcode encoding rule.

5. A computer-readable storage medium, wherein the computer-readable storage medium stores a computer program, and the computer program is executed by a processor to perform the color calibration method for a multicolor barcode according to claim 1.

6. The color calibration method for a multicolor barcode according to claim 2, wherein after the white balance correction step, the color calibration method further comprises the following steps:

a color obtaining step: extracting an average value of encoded colors of various data color blocks in a corrected multicolor barcode to obtain color information of the data blocks based on the HSB color space; and a barcode recognition step: obtaining a recognition result of the multicolor barcode based on the obtained color information of the data blocks based on the HSB color space and a barcode encoding rule.

7. The color calibration method for a multicolor barcode according to claim 3, wherein after the white balance correction step, the color calibration method further comprises the following steps:

a color obtaining step: extracting an average value of encoded colors of various data color blocks in a corrected multicolor barcode to obtain color information of the data blocks based on the HSB color space; and a barcode recognition step: obtaining a recognition result of the multicolor barcode based on the obtained color information of the data blocks based on the HSB color space and a barcode encoding rule.

8. A computer-readable storage medium, wherein the computer-readable storage medium stores a computer program, and the computer program is executed by a processor to perform the color calibration method for a multicolor barcode according to claim 2.

9. A computer-readable storage medium, wherein the computer-readable storage medium stores a computer program, and the computer program is executed by a processor to perform the color calibration method for a multicolor barcode according to claim 3.

10. A computer-readable storage medium, wherein the computer-readable storage medium stores a computer program, and the computer program is executed by a processor to perform the color calibration method for a multicolor barcode according to claim 4.

11. A computer-readable storage medium, wherein the computer-readable storage medium stores a computer program, and the computer program is executed by a processor to perform the color calibration method for a multicolor barcode according to claim 6.

12. A computer-readable storage medium, wherein the computer-readable storage medium stores a computer program, and the computer program is executed by a processor to perform the color calibration method for a multicolor barcode according to claim 7.

13. The color calibration method for a multicolor barcode according to claim 1, wherein there are two first color blocks, and the first color block, the second color block, and the first color block are successively connected to constitute the start color block.

14. The color calibration method for a multicolor barcode according to claim 1, wherein the first color block is a black color block, and area occupied by the second color block is 50% of area occupied by the start color block.

15. The color calibration method for a multicolor barcode according to claim 1, wherein an encoded color in the data color block corresponds to a respective character.

16. The color calibration method for a multicolor barcode according to claim 13, wherein an encoded color in the data color block corresponds to a respective character.

17. The color calibration method for a multicolor barcode according to claim 14, wherein an encoded color in the data color block corresponds to a respective character.

18. The color calibration method for a multicolor barcode according to claim 15, wherein the character is a numeral, and all numerals from 0 to 9 one-to-one correspond to respective encoded colors, so that the numerals are displayed as the encoded colors.

19. The color calibration method for a multicolor barcode according to claim 16, wherein the character is a numeral, and all numerals from 0 to 9 one-to-one correspond to respective encoded colors, so that the numerals are displayed as the encoded colors.

20. The color calibration method for a multicolor barcode according to claim 17, wherein the character is a numeral, and all numerals from 0 to 9 one-to-one correspond to respective encoded colors, so that the numerals are displayed as the encoded colors.

* * * * *